United States Patent

Umezawa

[11] Patent Number: 5,647,466
[45] Date of Patent: Jul. 15, 1997

[54] WET MULTIDISK FRICTION CLUTCH AND FABRICATION PROCESS THEREOF

[75] Inventor: Shigeki Umezawa, Shizuoka-ken, Japan

[73] Assignee: NSK-Warner K.K., Japan

[21] Appl. No.: 516,930

[22] Filed: Aug. 18, 1995

[30] Foreign Application Priority Data

Aug. 18, 1994 [JP] Japan .................. 6-215229

[51] Int. Cl.$^6$ .................. F16D 13/54; F16D 13/64
[52] U.S. Cl. .................. 192/70.14; 192/107 C; 192/107 M; 192/113.34; 192/113.36; 156/154; 428/66.2
[58] Field of Search .................. 192/70.12, 70.14, 192/113.34, 113.36, 107 R, 107 C, 107 M; 156/154; 428/66.2

[56] References Cited

U.S. PATENT DOCUMENTS

| | | | |
|---|---|---|---|
| 814,132 | 3/1906 | Hele-Shaw | 192/113.34 X |
| 2,175,418 | 10/1939 | Wales | 192/107 C |
| 2,927,673 | 3/1960 | Sand | 192/70.14 |
| 3,250,349 | 5/1966 | Byrnes et al. | 192/107 R X |
| 3,446,323 | 5/1969 | Hilpert | 192/107 R X |
| 3,491,865 | 1/1970 | Stockton | 192/70.14 |
| 4,010,831 | 3/1977 | Reuter | 192/113.34 X |
| 4,305,494 | 12/1981 | Ishida et al. | 192/107 M |
| 4,449,621 | 5/1984 | F'Geppert | 192/70.14 X |

FOREIGN PATENT DOCUMENTS

| | | |
|---|---|---|
| 63-99041 | 6/1988 | Japan . |
| 4-46235 | 4/1992 | Japan . |

*Primary Examiner*—Rodney H. Bonck
*Attorney, Agent, or Firm*—Evenson, McKeown, Edwards & Lenahan P.L.L.C.

[57] ABSTRACT

A wet multidisk friction clutch is constructed of a plurality of driving friction disks connected to an input shaft and a plurality of driven friction disks connected to an output shaft and arranged alternately with said driving friction disks, whereby power is selectively transmitted by frictional engagement between said driving friction disks and said driven friction disks. Each of said driving friction disks comprises a metal core and friction linings applied on opposite sides of said metal core and is partly cut off in a radial direction to define end portions, thereby forming a partly-open annular shape.

20 Claims, 8 Drawing Sheets

PRIOR ART

WET MULTIDISK FRICTION CLUTCH AND FABRICATION PROCESS THEREOF

BACKGROUND OF THE INVENTION a) Field of the Invention

This invention relates to a wet multidisk friction clutch, and especially to the construction of a driving friction disk formed of a disk-shaped metal core and friction linings bonded on opposite sides of, said disk-shaped metal core and also to a process for the fabrication of said disk-shaped metal core.

b) Description of the Related Art

Figure 5:
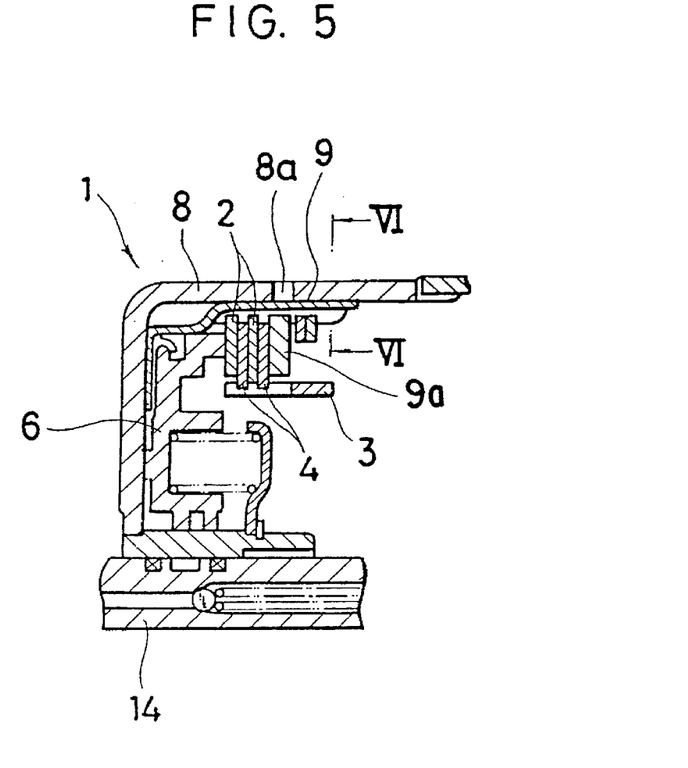
FIG. 5 is a fragmentary cross-sectional view of a wet multidisk friction clutch.
Figure 6:
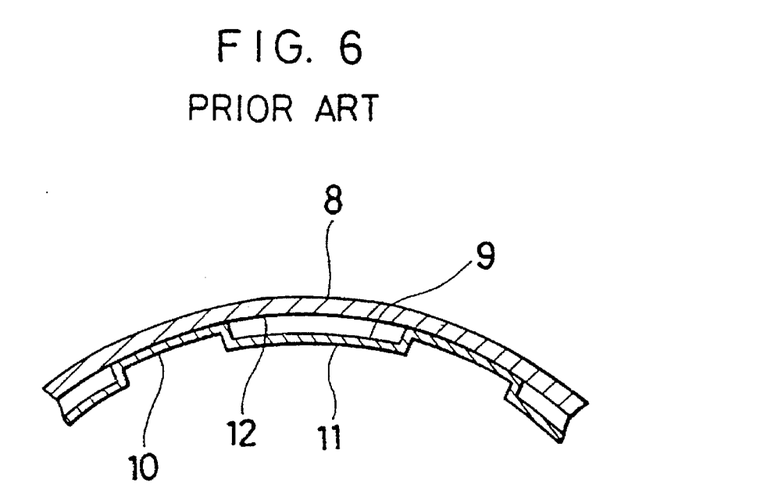
FIG. 6 is fragmentary cross-sectional view illustrating the construction of a conventional clutch drum, which corresponds to a cross-sectional view taken in the direction of arrows VI—VI of FIG. 5.
Figure 7A:
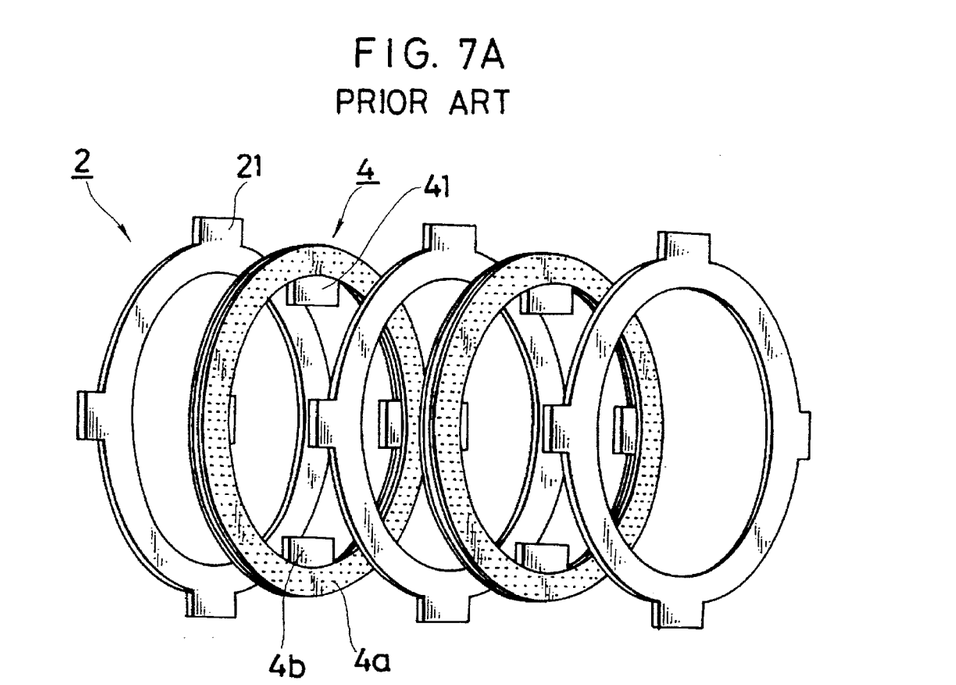
FIG. 7A and FIG. 7B illustrate the construction and arrangement of conventional friction disks.
Figure 7B:
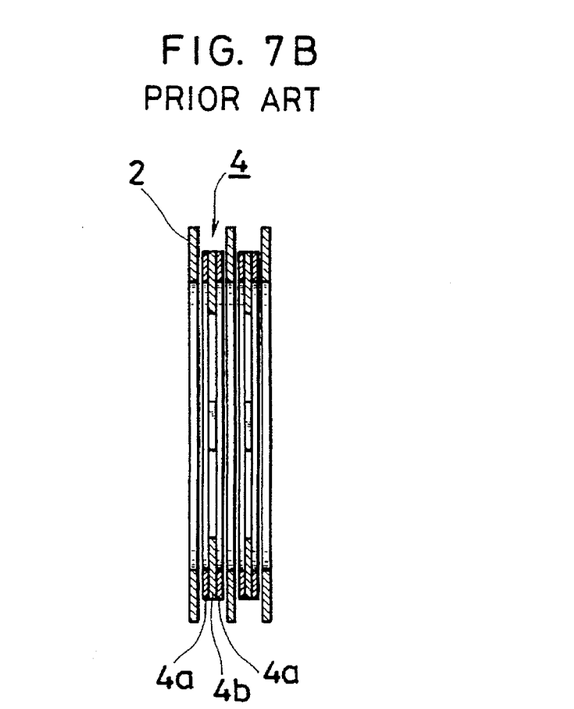

The basic construction of a wet multidisk friction clutch is shown in FIG. 5. FIG. 6 is a cross-sectional view corresponding to a view taken in the direction of arrows VI—VI of FIG. 5 and shows the construction of a conventional clutch drum. FIG. 7A and FIG. 7B illustrate the construction and arrangement of conventional friction disks. In FIG. 5, there are shown a clutch drum 1, driven friction disks 2, a clutch hub 3, driving friction disks 4, a piston 6, an engagement member 9a, and a cylindrical shaft 14.

FIG. 7A illustrates the construction and arrangement of the driven friction disks 2 and driving friction disks 4, whereas FIG. 7B shows the friction plates 2,4 in a stacked and pressed position. Each driven friction disk 2 is formed of a metal disk with spline tabs 21 arranged on an outer periphery thereof.

Each driving friction disk 4 is formed of a disk-shaped metal core 4b having spline tabs 41 arranged on an inner periphery thereof and wet friction linings 4a bonded on opposite sides of the disk-shaped metal core 4b.

FIG. 6 shows, as mentioned above, the conventional construction of the clutch drum 1, taken in the direction of arrows VI—VI of FIG. 5. The clutch drum 1 is constructed of an outer drum 8 and an inner drum 9. Designated at numeral 10 is a spline groove, with which the corresponding spline tab 21 of the driven friction disk 2 is maintained in engagement. Symbol 8a (see FIG. 5) indicates an oil supply hole.

The inner drum 9 is united by spot weld or the like to the outer drum 9 on a side of the piston 6.

Operation of the friction clutch will hereinafter be described with reference to FIG. 5. Alternately mounted on the cylindrical shaft 14, which is fixed on an unillustrated transmission case, are the driven friction disks 2 supported on the clutch drum 1 and the driving friction disks 4 supported on the clutch hub 3. These friction disks 2,4 are located between the clutch drum 1 supported for rotation and the clutch hub 3 fixed on another clutch drum (not shown).

When the friction disks 2,4 are pressed by the piston 6 against the engagement member 9a, power is transmitted from the clutch hub 3 to the clutch drum 1.

In a friction clutch, it is important to reduce drag torque and also to improve heat-resistant durability.

Figure 8A:
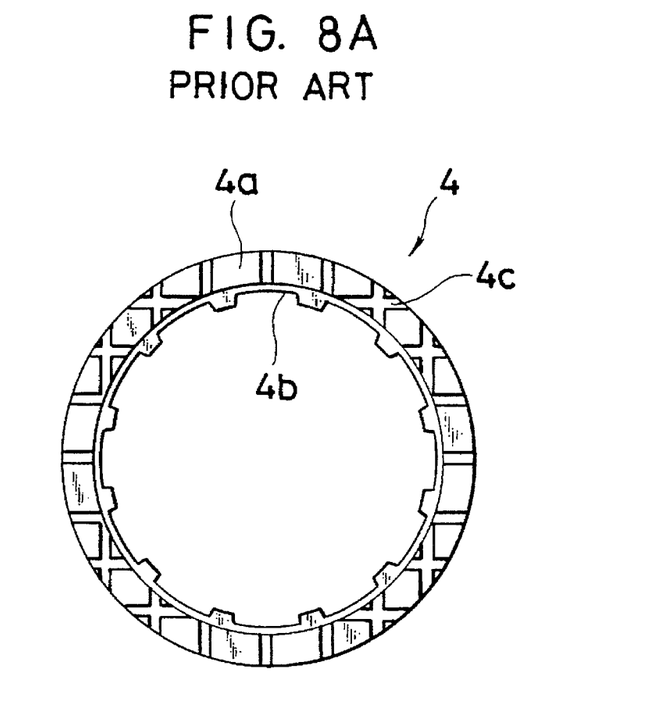
Figure 8B:
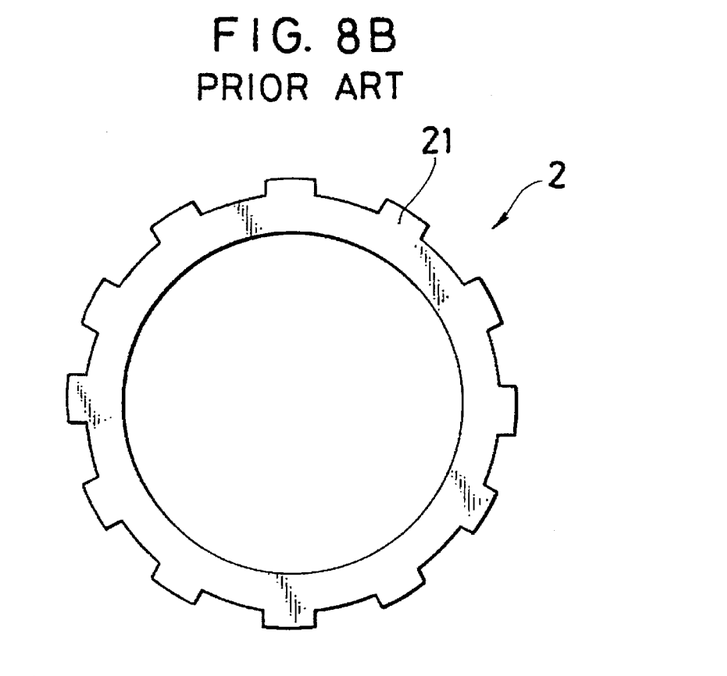
FIG. 8B depicts one example of a conventional driven friction disk usable in association with the conventional driving friction disk.

A groove pattern according to a conventional example, which reduces drag torque, is shown in FIG. 8A. Incidentally, FIG. 8A illustrates the driving friction disk 4 while FIG. 8B depicts the driven friction disk 2. In the driving friction disk 4, the friction linings 4a are bonded on the opposite sides of the disk-shaped metal core 4a (the spline tabs 41 and their adjacent portions are also observed). Oil grooves 4c are formed in a surface of each friction lining 4a, thereby reducing the shear resistance of a lubricating oil and also decreasing the drag torque.

Such a conventional wet multidisk friction clutch is accompanied by the problem that due to formation of a lubricating oil film, friction characteristics and idling-time drag torque vary (especially in a low temperature range in which the lubricating oil has high viscosity). To cope with this problem, it may be contemplated to form oil grooves in a surface of each friction lining as described above. An unduly high surface area percentage of oil grooves however leads to a problem in durability. Further, wearing of the friction lining results in a reduction in the cross-sectional area of each groove decreases, leading to another problem that the effect of the groove is reduced.

When exposed to heat of at least a certain quantity, more energy is absorbed per unit area than the cooling effect of such grooves. Thermal deterioration of the friction linings hence proceeds so that the friction linings may be caused to burn eventually. Accordingly, the reduction in drag torque and the heat-resistant service life of friction linings have the relationship that they conflict with each other with a certain inflexion point.

Further, the state of lubrication under continuous sliding, that is, the durability of the friction linings is significantly affected by the total cross-sectional area (volume) of oil grooves. To improve the heat-resistant service life, it is therefore important to supply the lubricating oil as much as possible. It is however impossible to achieve any sufficient groove depth (cross-sectional groove area) when the grooves are formed by molding or the like. Therefore, the grooves are formed to the metal core by cutting or the like. This however results in substantial cutting of fibers and the like which are supposed to maintain the strength of the friction linings. Accordingly, the durability of the friction linings is deteriorated. Moreover, a cutter may reach even the metal core due to a variation in machining so that the strength of the metal core may be reduced.

SUMMARY OF THE INVENTION

With the foregoing in view, the present invention has as its primary object the provision of a wet multidisk friction clutch either free of or improved in the above-described problems of the conventional wet multidisk friction clutches.

In one aspect of the present invention, there is thus provided a wet multidisk friction clutch constructed of a plurality of driving friction disks connected to an input shaft and a plurality of driven friction disks connected to an output shaft and arranged alternately with said driving friction disks, whereby power is selectively transmitted by frictional engagement between said driving friction disks and said driven friction disks. Each of said driving friction disks comprises a metal core and friction linings applied on opposite sides of said metal core and is partly cut off in a radial direction to define end portions, thereby forming a partly-open annular shape.

In another aspect of the present invention, there is thus provided a process for the fabrication of such a wet multidisk friction clutch as described above, wherein said metal core is obtained by bending a metal strip to make opposite end faces thereof come close to each other so that a partly-open planar annular shape is shaped.

Since the wet multidisk friction clutch according to the present invention is provided with the cut-off portion in each driving friction disk, this cut-off portion can be used as a cooling oil groove so that a sufficient oil groove area can be maintained to exhibit cooling effect. Further, no oil groove is formed in each friction lining so that the strength of the friction lining is not reduced. The friction lining is therefore provided with improved durability.

Further, waving can be readily formed on the metal strip to reduce the drag torque.

BRIEF DESCRIPTION OF THE DRAWINGS

The above and other objects, features and advantages of the present invention will become apparent from the following description and the appended claims, taken in conjunction with the accompanying drawings, in which:

FIG. 8A shows an illustrative groove pattern of a conventional driving friction disk, while

DETAILED DESCRIPTION OF THE INVENTION AND PREFERRED EMBODIMENTS

FIG. 1A through FIG. 1E illustrate driving friction disks 4 in wet multidisk friction clutches according to various embodiments of the present invention. In each of FIG. 1A through 1E, there are shown friction linings 4a, a disk-shaped metal core 4b, and spline tabs 41.

Figure 1A:
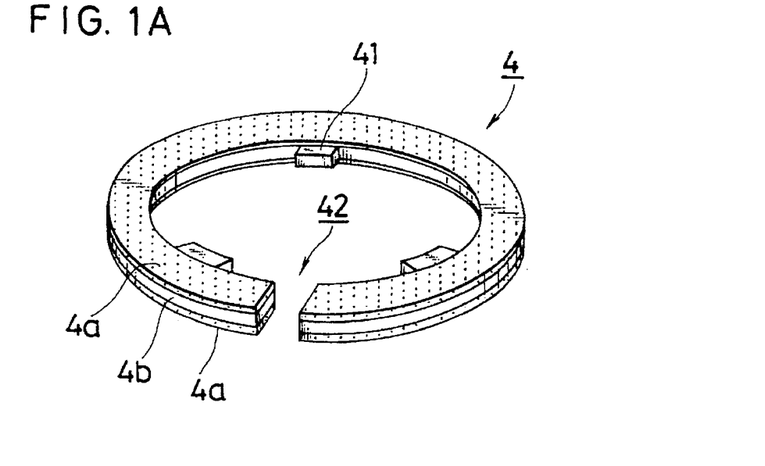
FIG. 1A through FIG. 1E are perspective views of driving friction disks in wet multidisk friction clutches according to various embodiments of the present invention.

In FIG. 1A, the driving friction disk 4 is provided with a cut-off portion 42, which extends in a radial direction to define end portions, thereby forming a partly-open annular shape.

Figure 1B:
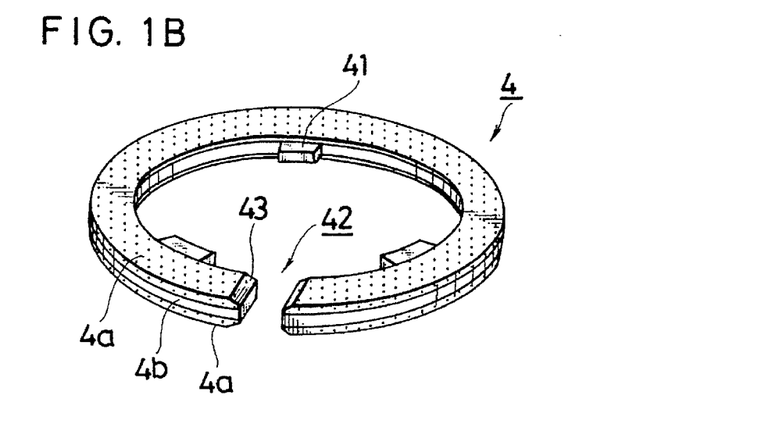

In FIG. 1B, each end portion is provided with chamfered portions 43.

Figure 1C:
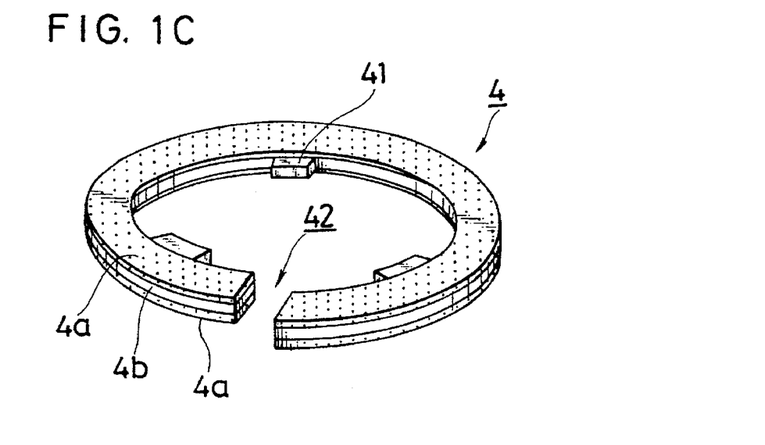

In FIG. 1C, the end portions define a step therebetween, in other words, the end portions are located at different levels.

Figure 1D:
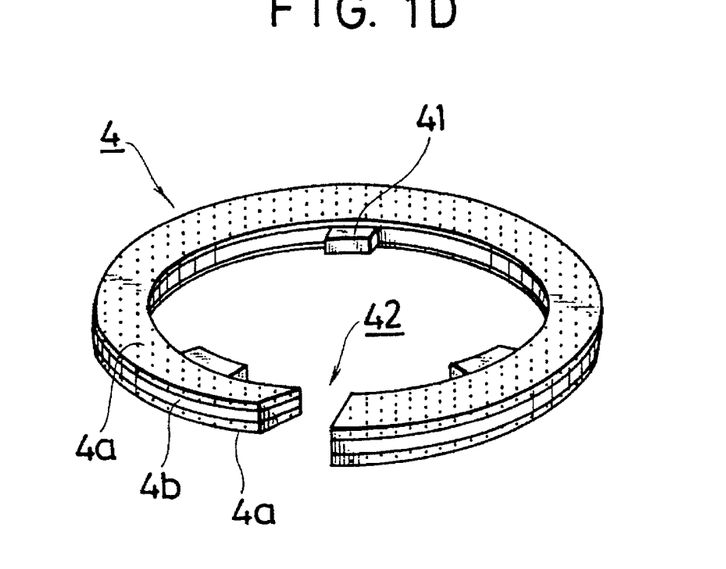

In FIG. 1D, the end portions are twisted relative to each other.

Figure 1E:
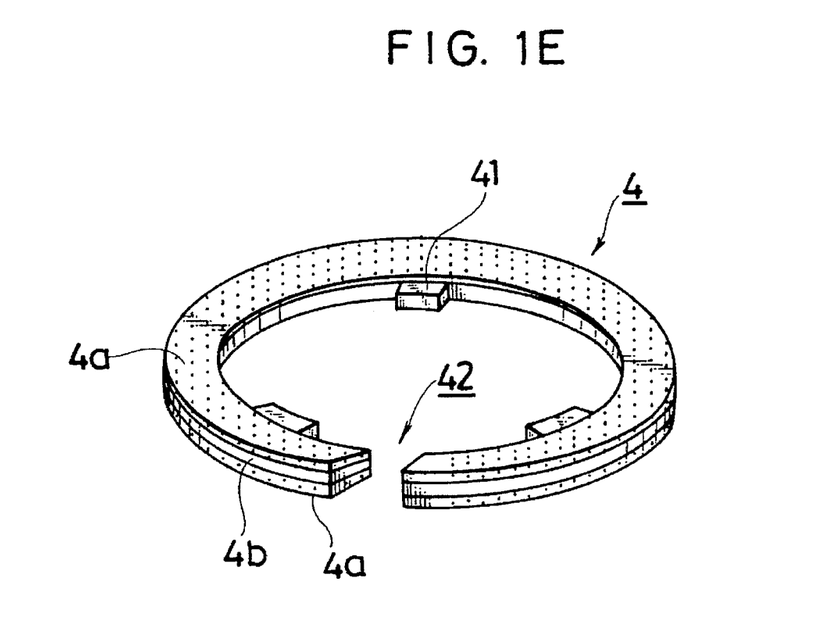

In FIG. 1E, the thickness of the driving friction disk 4 gradually decreases radially and inwardly. In the illustrated example, the friction linings 4a have the same thickness in the radial direction but the thickness of the disk-shaped metal core 4b decreases radially and inwardly. As an alternative, the disk-shaped metal core may have the same thickness in the radial direction, and the friction linings 4a may have a thickness which decreases radially and inwardly.

According to the present invention, a portion of a friction disk is radially cut off to provide a sufficient cross-sectional groove area, so that the drag torque reducing effect is enhanced. The cut-off portion serves as a lubricating-oil-discharging groove or channel having a sufficient dimension in the thicknesswise direction of the friction disk. This has made it possible to reduce the total surface area percentage of oil grooves, whereby the heat-resistant durability of the friction disk is not deteriorated. Further, in continuous sliding, oil supply and discharge grooves as large as the thickness of the friction disk are provided. This provides lubricating conditions better than those available from the conventional friction disks, leading to a further improvement in the heat-resistant durability. However, oil grooves may be formed in the surfaces of the friction linings to enhance the drag torque reducing effect further.

Incidentally, it may be contemplated from a similar standpoint to cut off each driven friction disk 2 on which no friction linings are bonded. It is however to be noted that the friction linings of the associated driving friction disks are elastic materials. These elastic friction linings of the driving friction disks therefore repeatedly enter the cut-off portion of the driven friction disk and are subjected to shear force. Wearing of the friction linings hence proceeds very quick, thereby creating a problem in durability. It is therefore impractical to partly cut off the driven friction disks in a radial direction.

Next, chamfering of the end portions as indicated at numeral 43 in FIG. 1B not only can promote the discharge of an oil film but also can retain a gap between friction disks owing to the wedging effect so that the drag torque reducing effect can be enhanced still further. In certain instances, it may be unnecessary to chamfer both the friction linings 4a at each end portion. In such cases, it may still be effective to chamfer only at least one of the friction linings 4a on at least one of the end portions facing each other with the cut-off portion 42 located therebetween.

To reduce the drag torque, it has heretofore been practiced in some instances to subject friction disks to waving work. Similar effects may however be achieved by twisting the end portions relative to each other as shown in FIG. 1C or arranging the end portions at different levels to define a step therebetween as illustrated in FIG. 1D. Incidentally, the term "waving work" as used herein means to form at least one of a driving friction disk and its associated driven friction disk into a wavy shape at equal angular intervals so that the driving friction disk and the driven friction disk are purposely maintained apart to reduce the drag torque during idling.

Figure 2A:
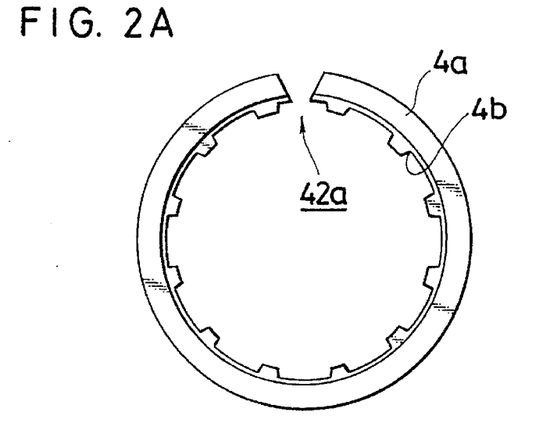
FIG. 2A through FIG. 2C are top plan views showing cut-off portions of various shapes.
Figure 2B:
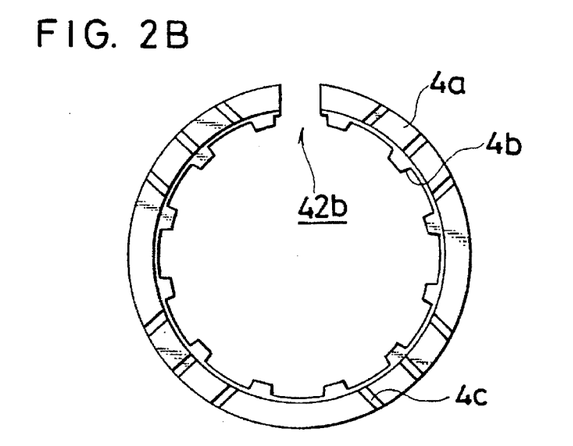
Figure 2C:
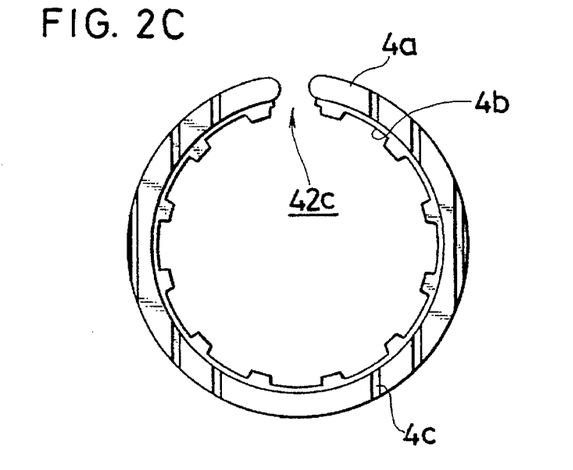

FIGS. 2A, 2B and 2C show various examples of the shape and width of the cut-off portion, which have been determined in view of the discharging readiness of a lubricating oil and the heat resistance of a friction lining while taking the total surface area percentage of grooves into parallel consideration. Symbols 42a, 42b and 42c indicate cut-off portions in the respective examples. In the examples of FIGS. 2B and 2C, oil grooves 4c are formed.

Figure 3A:
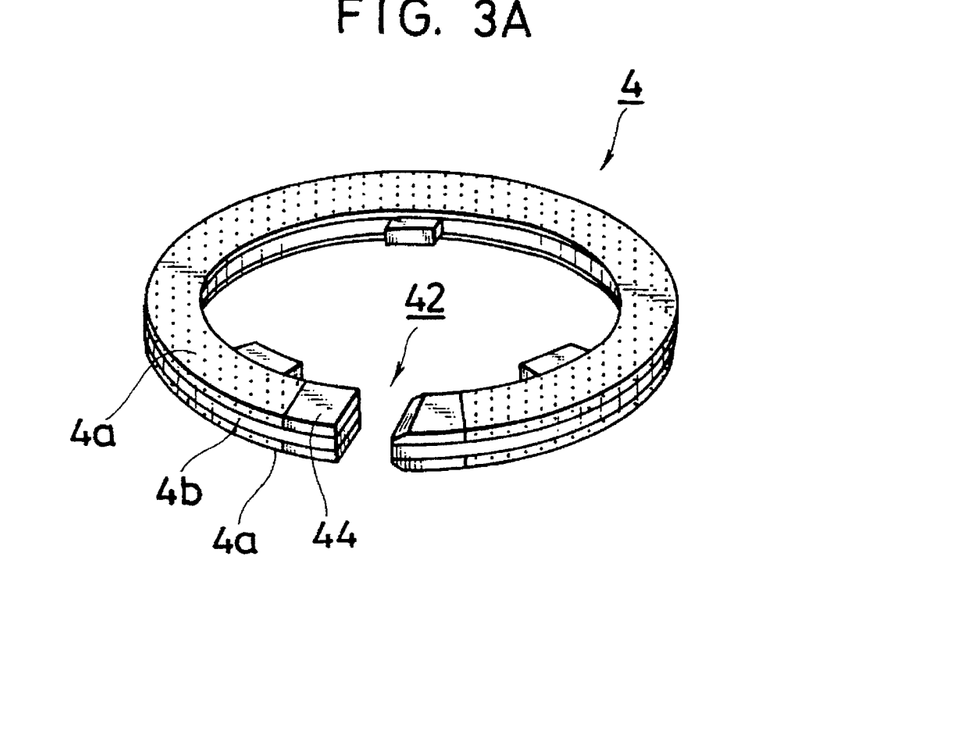
FIG. 3A and FIG. 3B are perspective views of examples of friction disks in which end portions are provided with additional parts.
Figure 3B:
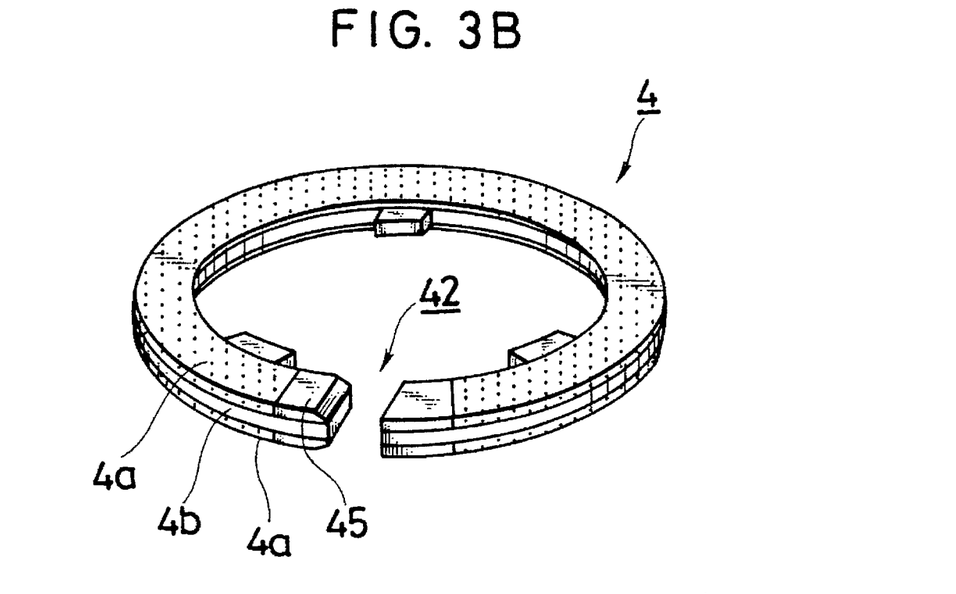

Depending on the conditions, the friction linings may be prone to breakage (e.g., cracking and chipping-off). This problem can be effectively avoided by bonding additional parts (e.g., hard friction linings or resin-made pieces) 44 as shown in FIG. 3A. It is important that such additional parts do not affect operation of the wet multidisk friction clutch. FIG. 3B depicts an alternative. As indicated by numeral 45, the linings 4a have a higher resin impregnation percentage adjacent the cut-off portion 42. Like the chamfering mentioned above, it may not be necessary in some instances to arrange such an additional part or to impregnate a resin at such a higher percentage for each of the friction linings 4a at each end portion. In such cases, it may still be effective to arrange such an additional part or to impregnate a resin at such a higher percentage for at least one of the friction linings 4a on at least one of the end portions facing each other with the cut-off portion 42 located therebetween.

Figure 4A:
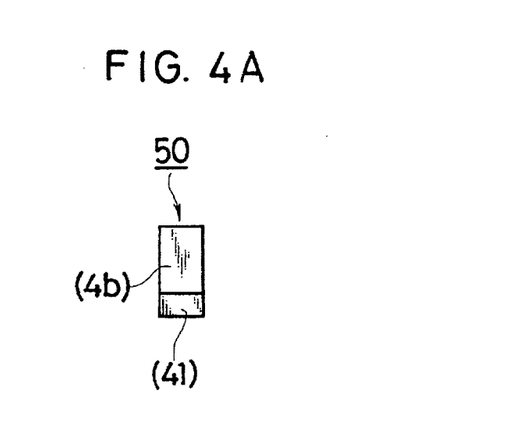
FIG. 4A through 4C illustrate a process according to one embodiment of the present invention for the fabrication of a friction disk.
Figure 4B:
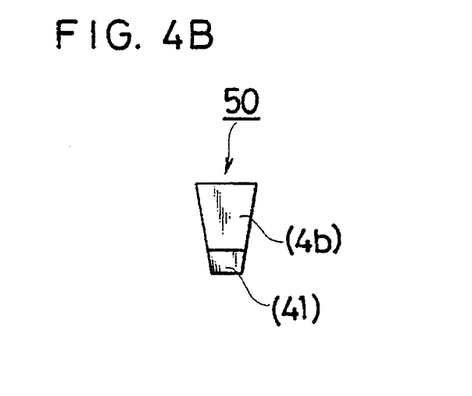
Figure 4C:
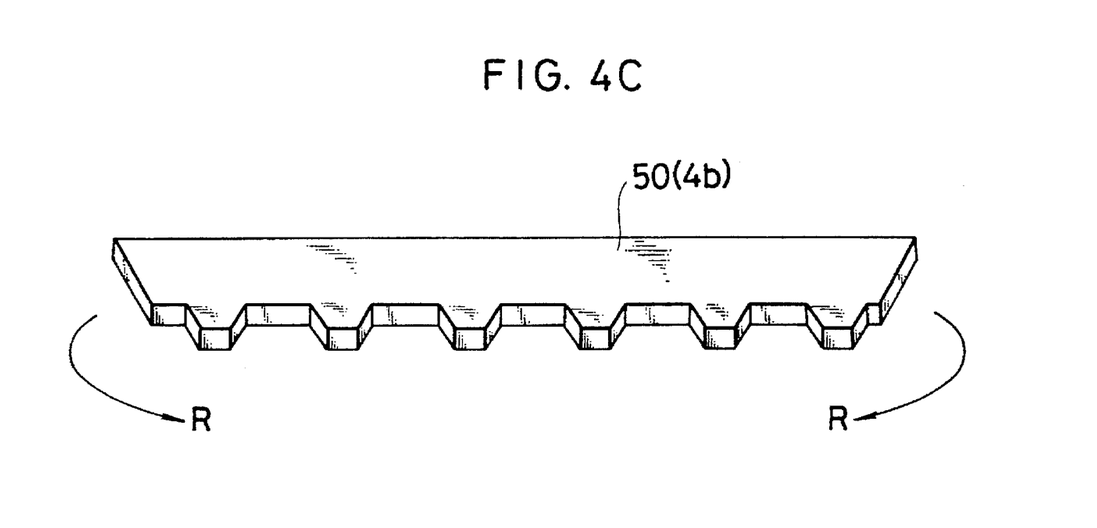

FIG. 4A through FIG. 4C shows a fabrication process of a metal core 4b. FIG. 4A shows a metal core stock, i.e., a steel strip 50 having a rectangular cross-section, whereas FIG. 4B depicts a steel strip 50 whose thickness becomes smaller toward a spline tab 41 to have a trapezoidal cross-section. FIG. 4C is a perspective view of a steel strip 50 from which a metal core 4b is formed.

Referring specifically to FIG. 4C, the steel strip 50 is bent as indicated by arrows R so that an annular core metal 4b is formed. When the metal strip 50 has a trapezoidal cross-section as shown in FIG. 4B, the metal strip 50 is bent with the thinner side positioned on a side to be formed into an inner periphery of the resulting annular core metal. Accordingly, the metal strip 50 is pulled and stretched on an outer side but is compressed on an inner side. It is therefore possible to form metal core having a uniform thickness. When the metal strip 50 has a rectangular cross-section as shown in FIG. 4A, the resulting metal core has a thickness which gradually increases from an outer periphery thereof toward an inner periphery thereof.

Having now fully described the invention, it will be apparent to one of ordinary skill in the art that many changes and modifications can be made thereto without departing from the spirit or scope of the invention as set forth herein.

What is claimed is:

1. A wet multidisk friction clutch comprising:
   a plurality of driving friction disks connected to an input shaft; and
   a plurality of driven friction disks connected to an output shaft and arranged alternately with said driving friction disks, wherein power is selectively transmitted by frictional engagement between said driving friction disks and said driven friction disks, and wherein each of said driving friction disks comprises a metal core and friction linings applied on opposite sides of said metal core, each of said driving friction disks forming a generally annular shape and being completely cut off in a radial direction to define a first end portion and a second end portion, said first end portion being spaced apart from said second end portion in a circumferential direction to define a gap which extends completely through a radial cross-section of said driving friction disk, said first end portion generally facing said second end portion.

2. A wet multidisk friction clutch according to claim 1, wherein said end portions are twisted relative to each other.

3. A wet multidisk friction clutch according to claim 1, wherein said end portions define a step therebetween.

4. A wet multidisk friction clutch according to claim 1, wherein said friction linings comprise a first material, and wherein at least one of said friction linings comprises an additional part at one of said end portions, said additional part comprising a second material which is different from said first material.

5. A wet multidisk friction clutch according to claim 4, wherein said second material comprises one of a friction material which is harder than said friction linings and a resin material.

6. A wet multidisk friction clutch according to claim 1, wherein said friction linings are impregnated with resin, and at least one of said friction linings has a higher resin impregnation percentage adjacent at least one of said end portions than a remainder of the at least one of said friction linings.

7. A wet multi-disk friction clutch according to claim 1, wherein said metal core comprises a metal strip which has been bent into said generally annular shape such that opposite end faces of the metal strip come close to each other, said end faces defining said gap.

8. A wet multi-disk friction clutch according to claim 7, wherein prior to being bent into said generally annular shape, said metal strip has a trapezoidal cross-section which decreases in thickness from a thicker side to a thinner side, and wherein said metal strip is bent with the thinner side positioned on a side formed into an inner periphery of said generally annular shape in order to form said metal core with a uniform thickness.

9. A process for the fabrication of a driving friction disk for a wet multi-disk friction clutch, said process comprising the steps of:
   bending a metal strip such that opposite end faces thereof come close to each other to form a generally annular metal core; and
   applying friction linings on opposite sides of said metal core such that end portions of said friction linings and said end faces of the metal strip define a gap which extends completely through a radial cross-section of said driving friction disk.

10. A process according to claim 9, wherein prior to the bending step, said metal strip has a trapezoidal cross-section which decreases in thickness from a thicker side to a thinner side, and wherein during said bending step the metal strip is arranged with the thinner side positioned on a side to be formed into an inner periphery of said metal core such that said metal core is formed with a uniform thickness.

11. A wet multidisk friction clutch comprising:
    a plurality of first friction disks connected to one of an input shaft and an output shaft; and
    a plurality of second friction disks connected to the other of the input shaft and the output shaft and arranged alternately with said first friction disks,
    wherein each of said first friction disks comprises a metal core, friction linings applied to opposite axial sides of said metal core, and at least one radially inwardly extending spline tab, and
    each of said first friction disks forms a generally annular shape and has a first end portion and a second end portion, said first end portion being spaced apart from said second end portion in a circumferential direction to define a gap which extends completely through a radial cross-section of said first friction disk.

12. A wet multidisk friction clutch according to claim 11, wherein said end portions are twisted relative to each other.

13. A wet multidisk friction clutch according to claim 11, wherein said end portions are twisted relative to each other.

14. A wet multidisk friction clutch according to claim 11, wherein said friction linings comprise a first material, and wherein at least one of said friction linings comprises an additional part at one of said end portions, said additional part comprising a second material which is different from said first material.

15. A wet multidisk friction clutch according to claim 14, wherein said second material comprises one of a friction material which is harder than said friction linings and a resin material.

16. A wet multidisk friction clutch according to claim 11, wherein said friction linings are impregnated with resin, and wherein at least one of said friction linings has a higher resin impregnation percentage adjacent at least one of said end portions than a remainder of the at least one of said friction linings.

17. A wet multi-disk friction clutch according to claim 11, wherein said metal core comprises a metal strip which has been bent into said generally annular shape such that opposite end faces of the metal strip come close to each other, said end faces defining said gap.

18. A wet multi-disk friction clutch according to claim 17, wherein prior to being bent into said generally annular shape, said metal strip has a trapezoidal cross-section which decreases in thickness from a thicker side to a thinner side, and wherein said metal strip is bent with the thinner side positioned on a side formed into an inner periphery of said generally annular shape in order to form said metal core with a uniform thickness.

19. A wet multidisk friction clutch according to claim 11, wherein said first end portion generally faces said second end portion.

20. A wet multidisk friction clutch according to claim 11, wherein said first friction disks comprise driving friction disks which are connected to the input shaft, and wherein said second friction disks comprise driven friction disks which are connected to the output shaft.

* * * * *